United States Patent
Diehm et al.

(10) Patent No.: US 9,067,817 B2
(45) Date of Patent: Jun. 30, 2015

(54) SYSTEM AND METHOD TO COAT GLASS GOBS WITH A LUBRICATING DISPERSION DURING THE DROP TO BLANK MOLDS

(71) Applicants: Emhart Glass S.A., Cham (CH); Timcal Ltd., Cham (CH)

(72) Inventors: Leo Diehm, Cham (CH); Thomas L. Sidler, North Ridgeville, OH (US); Michal T. Judge, Oak Harbor, OH (US)

(73) Assignees: Emhart Glass S.A., Cham (CH); Timcal Ltd., Bodio (CH)

( * ) Notice: Subject to any disclaimer, the term of this patent is extended or adjusted under 35 U.S.C. 154(b) by 218 days.

(21) Appl. No.: 13/833,168

(22) Filed: Mar. 15, 2013

(65) Prior Publication Data

US 2014/0260427 A1 Sep. 18, 2014

(51) Int. Cl.
*C03B 7/16* (2006.01)
*C03B 40/02* (2006.01)

(52) U.S. Cl.
CPC .. *C03B 40/02* (2013.01); *C03B 7/16* (2013.01)

(58) Field of Classification Search
CPC .............. C03B 7/16; C03B 7/14; C03B 7/18; C03B 7/20; C03B 7/22
See application file for complete search history.

(56) References Cited

U.S. PATENT DOCUMENTS

| | | | | | |
|---|---|---|---|---|---|
| 1,531,561 | A | * | 3/1925 | Lynch | 65/304 |
| 1,645,221 | A | * | 10/1927 | Barker, Jr. | 65/122 |
| 3,592,624 | A | * | 7/1971 | Dahms | 65/225 |
| 3,672,860 | A | * | 6/1972 | Keller | 65/208 |
| 3,857,691 | A | * | 12/1974 | Jones et al. | 65/303 |
| 3,981,711 | A | * | 9/1976 | Bjorkstrom | 65/165 |
| 4,165,974 | A | | 8/1979 | Goodwin | |
| 4,391,620 | A | * | 7/1983 | Geisel | 65/26 |
| 4,526,600 | A | * | 7/1985 | Myers | 65/24 |
| 4,806,137 | A | * | 2/1989 | Virey | 65/26 |
| 4,880,454 | A | * | 11/1989 | Beningo | 65/24 |
| 4,990,171 | A | | 2/1991 | Kojima et al. | |
| 5,597,306 | A | * | 1/1997 | Horlitz et al. | 433/173 |
| 5,785,727 | A | | 7/1998 | Mine et al. | |
| 6,595,026 | B1 | * | 7/2003 | Tsukada | 65/24 |
| 8,375,743 | B2 | * | 2/2013 | Zanella et al. | 65/26 |
| 2011/0247363 | A1 | * | 10/2011 | Dalstra | 65/29.1 |

FOREIGN PATENT DOCUMENTS

| | | |
|---|---|---|
| EP | 0278114 | 8/1988 |
| FR | 2718430 | 10/1995 |
| JP | 2005-067992 | 3/2005 |

OTHER PUBLICATIONS

European Search Report for European Application No. 14158417 dated Jun. 5, 2014, 6 pages.
PCT International Search Report Written Opinion for International Application No. PCT/US2014/018516 dated Jun. 25, 2014, 8 pages.

* cited by examiner

*Primary Examiner* — Jodi C Franklin
(74) *Attorney, Agent, or Firm* — Reinhart Boerner Van Deuren s.c.

(57) ABSTRACT

A system and method for coating glass gobs with a liquid-based lubricating dispersion during their drop to blank glass container molds which provides sufficient lubrication to the glass container molds without requiring swabbing of the glass container molds. The lubricating dispersion is sprayed onto hot glass gobs as they fall from the gob supply system prior to their distribution by the gob distribution system into blank molds. The lubricating dispersion coats the falling glass gobs to lubricate the glass gobs as well as the molds.

29 Claims, 9 Drawing Sheets

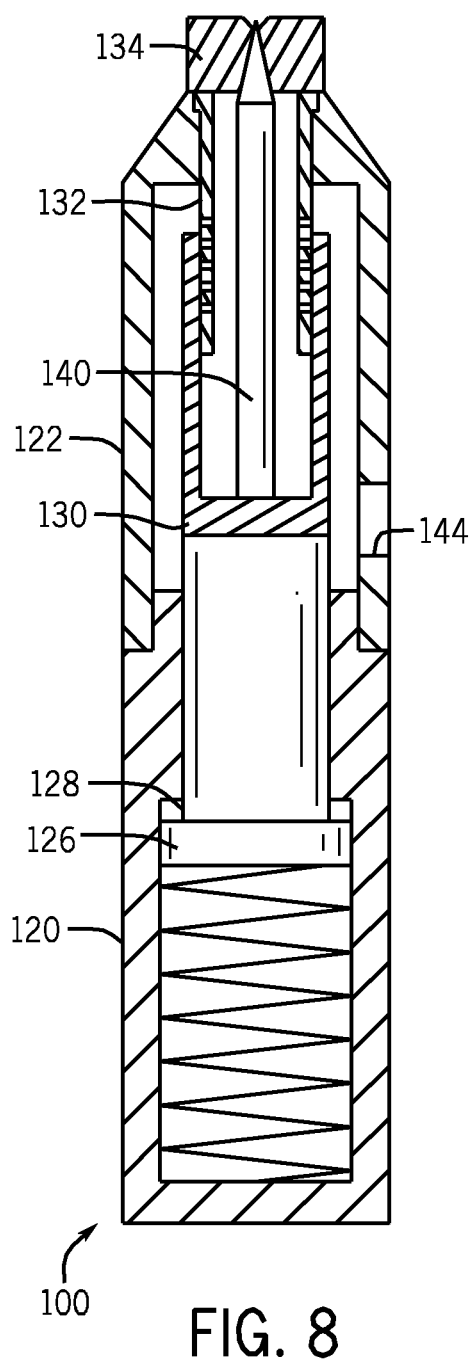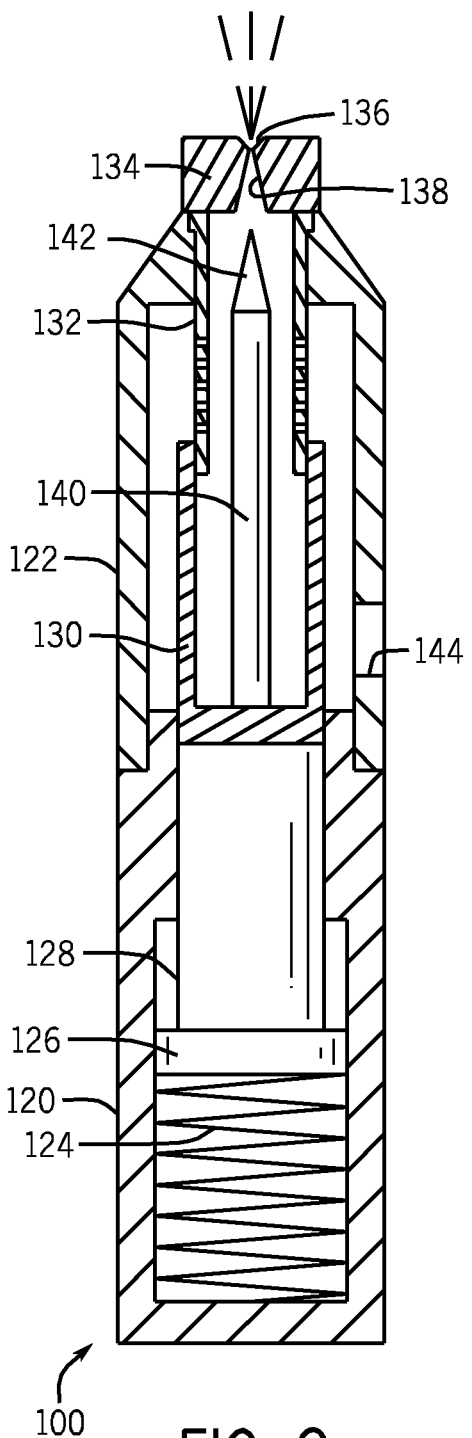

SYSTEM AND METHOD TO COAT GLASS GOBS WITH A LUBRICATING DISPERSION DURING THE DROP TO BLANK MOLDS

BACKGROUND OF THE INVENTION

Field of the Invention

The present invention relates generally to the lubrication of glass container manufacturing molds, and more particularly to an improved system and method for coating glass gobs with a liquid-based lubricating dispersion during their drop to blank glass container molds which provides sufficient lubrication to the glass container molds without requiring swabbing of the glass container molds.

Glass containers produced on individual section (I.S.) machines are manufactured in two steps, the first of which is performed in a blank (or parison) mold that forms a glass container preform or parison, and the second of which blows the preform into the glass container. Discrete segments of molten glass referred to in the industry as glass "gobs" are sheared from a continuous stream of hot glass from a feeder, with the gobs then being distributed by a gob distributor to multiple glass delivery systems consisting of scoops, troughs, and deflectors into the respective blank molds in the section of the IS machine. This delivery of gobs into the blank molds is referred to in the industry as "loading" the blank molds.

The gobs of hot glass in the blank molds are then formed into pre-containers referred to as parisons, either by using a metal plunger to push the glass gob into the blank mold, or by blowing the glass gob out from below into the blank mold. The blank mold then opens and the parisons are inverted and transferred to blow molds, where the parisons are blown out into the shape of finished glass containers. The blown parisons are then cooled in the blow molds to the point where they are sufficiently rigid to be gripped and removed from the blow stations.

The final glass thickness distributions in the finished glass containers are to a large extent determined in the blank molds, with the exception of anomalies which may be caused by improper parison invert speed and timing. For any particular glass container design, for the most part, the manner in which the glass is distributed in the finished glass container is determined by the glass distribution in the parison. In order to obtain the proper glass distribution in the parison, it is necessary to ensure that the hot gobs load properly into the blank molds, meaning that the gobs must load deeply into the blank molds. Additionally, it is also necessary to have a slippery interface between the glass material in the gobs and the interior surfaces of the blank molds both to facilitate the molding process as well as to ensure proper release of the parisons from the blank molds.

Both of these objectives have been achieved in the industry by lubricating the interiors of the parison molds in a process referred to as "swabbing" the blank molds. The swabbing operation is typically performed by an operator using a brush dipped beforehand into a lubricant. Commercially prepared swabbing compound typically includes the same basic ingredients, namely graphite, sulfur compounds, and proprietary additives, all in a petroleum-based suspension. See, for example, U.S. Pat. No. 3,242,075, to Hunter, which teaches a high temperature lubricant consisting of graphite particles, an oil carrier, a film-forming polymer ("filomer"), and an antioxidant. Swabbing is typically performed with the I.S. machine in normal operation, although at least one gob operating cycle must be dropped to allow sufficient time to perform the swabbing operation with an acceptable degree of safety.

During the swabbing operation, the operator must manually intervene by stopping the operation of the molds long enough to swab the blank molds (and possibly the neck rings and blow mold) with the lubricant, which is a labor-intensive operation that must be done in order to prevent potential jam ups of the molding apparatus due to insufficient lubricant. Further, the lubrication of the blank molds is often done on an at least somewhat irregular basis, which may vary the degree to which the blank molds are lubricated. Still further, the quantity of the lubricant deposited inside the blank mold may be more or less than the necessary quantity, and the deposited lubricant inside the blank mold may be uneven. Thus, it will be appreciated that swabbing as an operation is far from precise and as such is at least somewhat irregular.

Alternatives to manual swabbing have been proposed. Several examples of such alternatives provide different methods of applying the lubricant to the blank molds. U.S. Pat. No. 5,597,396 to Tohjo, teaches a robot swabbing device that carries a swabbing member rubbing a swabbing lubricant onto blank molds. U.S. Pat. No. 8,375,743, to Zanella et al., teaches a process for spraying lubricant through a spray tube inserted into the blank molds. While both of these devices have the advantage of reducing the danger to the machine operator, they both also have the potential disadvantage of being imprecise in their application of lubricant into the blank molds.

There are several potential downsides of both manual swabbing of the blow molds and either robot swabbing of the blank molds or spraying lubricant into the blow molds. First, the blank mold surface may be temporarily chilled by the swabbing compound, yielding heavier sidewalls and lighter bases. Second, and more frequently, heat transfer across the glass-blank mold interface may be reduced due to thermal insulation incident to the swabbing compound, which would result in the blank molds "running hot," which will result in lighter sidewalls and heavier bases.

One other unsuccessful approach that has been taken is shown in U.S. Pat. No. 4,526,600, to Myers, which teaches spraying falling glass gobs with a flame spray lubricating device with forced air burners having graphite delivered thereto the through a fluidized bed and air feed arrangement, and the apparatus for performing this operation, which is shown in U.S. Pat. No. 4,880,454, to Beningo, which flame sprays the powdered graphite directly onto falling hot gobs from two sides of the gobs and uses vacuum exhaust headers to collect overspray from the powdered graphite sprays. The flame spraying process is rather complex and costly, and does not apply the graphite powder specifically to the glass gob which leads to overspray, which results in the accumulation of graphite powder in the area of the I.S. machine. Since it is impossible to collect anything close to all of the sprayed power graphite, and since finely powdered graphite could also potentially be inhaled which is of course problematic, the Myers method and the Beningo system are undesirable in a glass container manufacturing environment. Thus, manual or robot swabbing or spraying lubricant directly onto the blank molds has remained the only viable way to lubricate the blank molds, even though these techniques all have the well-known deficiencies discussed above.

It will thus be appreciated that it would be desirable to provide a system and method to apply a lubricating dispersion to glass gobs after the gobs are formed and before they are loaded into blank molds without requiring manual intervention to do so. It would also be desirable that such a system and method to apply the lubricating dispersion to the gobs while they are in free fall and not in contact with any portion of the gob distribution system. It would further be desirable that the system and method to apply a lubricating dispersion to gobs entirely obviate the need to swab the blank molds with a lubricating dispersion, thereby removing a variable, difficult, and labor intensive operation of hand swabbing the blank molds, with the lubricant thereby continuously lubricating the blank molds, the neck rings, and the blow molds.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, a liquid-based lubricating dispersion is sprayed onto glass gobs as they fall from the gob supply system and prior to their distribution by the gob distribution system into blank molds. The lubricating dispersion thereby coats the falling glass gobs to lubricate them prior to their entry into the blank molds, thereby at least minimizing, if not completely eliminating, the need for conventional swabbing of the blank molds. In a preferred embodiment, the lubricating dispersion is sprayed onto the falling glass gobs after they have been cut by the shears mechanism from the molten glass stream supplied by the gob feeder, and before the falling glass gobs enter the funnels leading to the scoops, the troughs, and the deflectors in the gob distribution system which distributes them to the blank molds. Alternatively, the lubricating dispersion may be sprayed onto the glass gobs at any other location in the gob distribution system.

In a preferred embodiment, the lubricating dispersion is applied to the falling glass gobs as they fall through an enclosure or spray box having openings in spaced-apart top and bottom surfaces of the enclosure through which the glass gobs fall. A plurality of nozzles are located adjacent side walls of the enclosure or spray box and are oriented so as to direct sprays of the lubricating dispersion onto the glass gobs to coat them with the lubricating dispersion as they pass through the enclosure or spray box. In the preferred embodiment, a pumping device is used to supply the lubricating liquid dispersion to the nozzles.

The lubricating dispersion may contain any suitable lubricant material that will provide the necessary lubricity to the glass gobs to lubricate them as they pass through the gob distribution system, as they are molded into parisons in the blank mold, and as they are blown into glass containers in the blow molds. The lubricating dispersion preferably uses powdered graphite or alternative powdered solid lubricants as the lubricating material, with the lubricating dispersion of the powdered graphite minimizing or eliminating the issue of previously known systems that flame sprayed powdered graphite onto falling glass gobs. Other constituents of the lubricating dispersion are a block polymer or alternative dispersing agent and a rheological modifier, all in a water-based lubricating dispersion with the water serving as a solvent.

In a system embodiment, a system for applying a lubricant to free falling hot glass gobs prior to the distribution and loading of the gobs into respective blank molds in an I.S. machine comprises: an enclosure comprising a top surface, a bottom surface, and side walls extending between the top surface and the bottom surface, the top surface and the bottom surface having corresponding openings therein, wherein the openings in the top surface and the bottom surface are arranged and configured in the top surface and the bottom surface to allow the free falling gobs to pass freely through the openings in the enclosure without contacting the enclosure when the enclosure is mounted in the path of the free falling gobs; a source of a liquid-based lubricating dispersion for lubricating the gobs; a plurality of nozzles being mounted in or adjacent to the enclosure, each of the nozzles being arranged and configured to direct a spray of the lubricating dispersion therefrom into the enclosure and onto the free falling gobs as they pass through the enclosure to substantially completely coat the gobs with material sprayed from the nozzles; and a pump system for pumping the lubricating dispersion from the source of the lubricating dispersion to the nozzles mounted in the enclosure.

In another system embodiment, a system for applying a lubricant to free falling hot glass gobs sheared from a stream of molten glass provided from a feeder prior to the distribution and loading of the gobs into respective blank molds in an I.S. machine including a gob supply apparatus for providing gobs and a gob distribution system that distributes the glass gobs to the blank molds comprises: an enclosure comprising a top surface, a bottom surface, and side walls extending between the top surface and the bottom surface, the top surface and the bottom surface having corresponding openings therein, wherein the enclosure is arranged and configured for installation intermediate the path of the glass gobs as they fall from the gob supply apparatus and before they enter the gob distribution system, and wherein the openings in the top surface and the bottom surface are arranged and configured in the top surface and the bottom surface to allow the free falling gobs to pass freely through the openings in the enclosure without contacting the enclosure when the enclosure is mounted in the path of the free falling gobs; a high pressure source of a liquid-based lubricating dispersion for lubricating the gobs, the lubricating dispersion comprising powdered synthetic or natural graphite in a water-based dispersion; at least four nozzles being mounted in or adjacent to the enclosure, each of the nozzles being arranged and configured to direct a spray of the lubricating dispersion therefrom from a different orientation into the enclosure and onto the free falling gobs as they pass through the enclosure to substantially completely coat the gobs with the lubricating dispersion sprayed from the nozzles; and a pump system for pumping the lubricating dispersion from the source of the lubricating dispersion to the nozzles mounted in the enclosure.

In still another system embodiment, a system for applying a lubricant to free falling hot glass gobs in an I.S. machine comprises: an enclosure comprising corresponding openings respectively located in top and bottom surfaces having side walls extending therebetween, wherein the enclosure is arranged and configured for mounting with respect to the I.S. machine such that free falling gobs pass freely through the openings in the enclosure; a plurality of nozzles mounted in or adjacent to the enclosure; and a pump that pumps a liquid-based lubricating dispersion for lubricating the gobs from a source of the lubricating dispersion to the nozzles; wherein the nozzles are each arranged and configured to direct a spray of the lubricating dispersion into the enclosure and onto the free falling gobs as they pass through the enclosure.

In a method embodiment, a method for applying a lubricant to free falling hot glass gobs sheared from a stream of molten glass provided from a feeder prior to the distribution and loading of the gobs into respective blank molds in an I.S. machine is disclosed which comprises: locating an enclosure in the path of the free falling gobs, the enclosure comprising a top surface, a bottom surface, and side walls extending between the top surface and the bottom surface, the top surface and the bottom surface having corresponding openings therein, wherein the enclosure is mounted such that the free falling gobs fall through the openings in the top surface and the bottom surface without contacting the enclosure; pumping a liquid-based lubricating dispersion for lubricating the gobs from a source of the lubricating dispersion to a plurality of nozzles mounted in or adjacent to the enclosure with a pump system; and directing sprays of the lubricating dispersion emitted from the nozzles into the enclosure and onto falling gobs as they pass through the enclosure to substantially completely coat the gobs with material sprayed from the nozzles.

In a method embodiment, a method for applying a lubricant to free falling hot glass gobs is disclosed which comprises: providing a liquid-based lubricating dispersion for lubricating the gobs at a selected location in a path of the free falling gobs; and spraying the lubricating dispersion onto the falling gobs as they pass the selected location to substantially completely coat the gobs with the lubricating dispersion.

The falling gob lubricating dispersion application system and method of the present invention provides a system and method to apply a liquid-based lubricating dispersion to glass gobs after the gobs are formed and before they are loaded into blank molds without requiring manual intervention to do so. The falling gob lubricating dispersion application system and method of the present invention applies the liquid-based lubricating dispersion to the gobs while they are in free fall and not in contact with any portion of the gob distribution system, thereby also providing lubrication to the gob distribution system. The falling gob lubricating dispersion application system and method of the present invention entirely obviates the need to swab the blank molds with a lubricating dispersion, thereby removing a variable, difficult, and labor intensive operation of hand swabbing the blank molds, with the lubricant thereby continuously lubricating the blank molds, the neck rings, and the blow molds. Finally, the falling gob lubricating dispersion application system and method of the present invention achieves numerous advantages without incurring any substantial relative disadvantage.

DESCRIPTION OF THE DRAWINGS

These and other advantages of the present invention are best understood with reference to the drawings, in which:

FIG. 8 is a somewhat schematic cross-sectional view of one of the spray nozzles illustrated in FIGS. 3, 5, and 8 showing its internal construction when the spray nozzle is in a closed position;

FIG. 9 is a somewhat schematic cross-sectional view of the spray nozzle illustrated in FIG. 7 showing its internal construction when the spray nozzle is in an open position;

DETAILED DESCRIPTION OF AN EXEMPLARY EMBODIMENT

An exemplary embodiment of the falling gob liquid-based lubricating dispersion application system and method of the present invention will be described herein with reference to the figures, it being understood that it is an illustrative description, and as such it is not intended to limit in any way variations and other embodiments thereof. The system and method of the present invention applies a liquid-based lubricating dispersion to free falling hot glass gobs prior to their distribution and loading into blank molds in an I.S. machine. The lubricating dispersion is sprayed onto the falling gobs and provides them with sufficient lubricity to make it unnecessary to swab the blank molds, the neck rings, or the blow molds.

Figure 1:
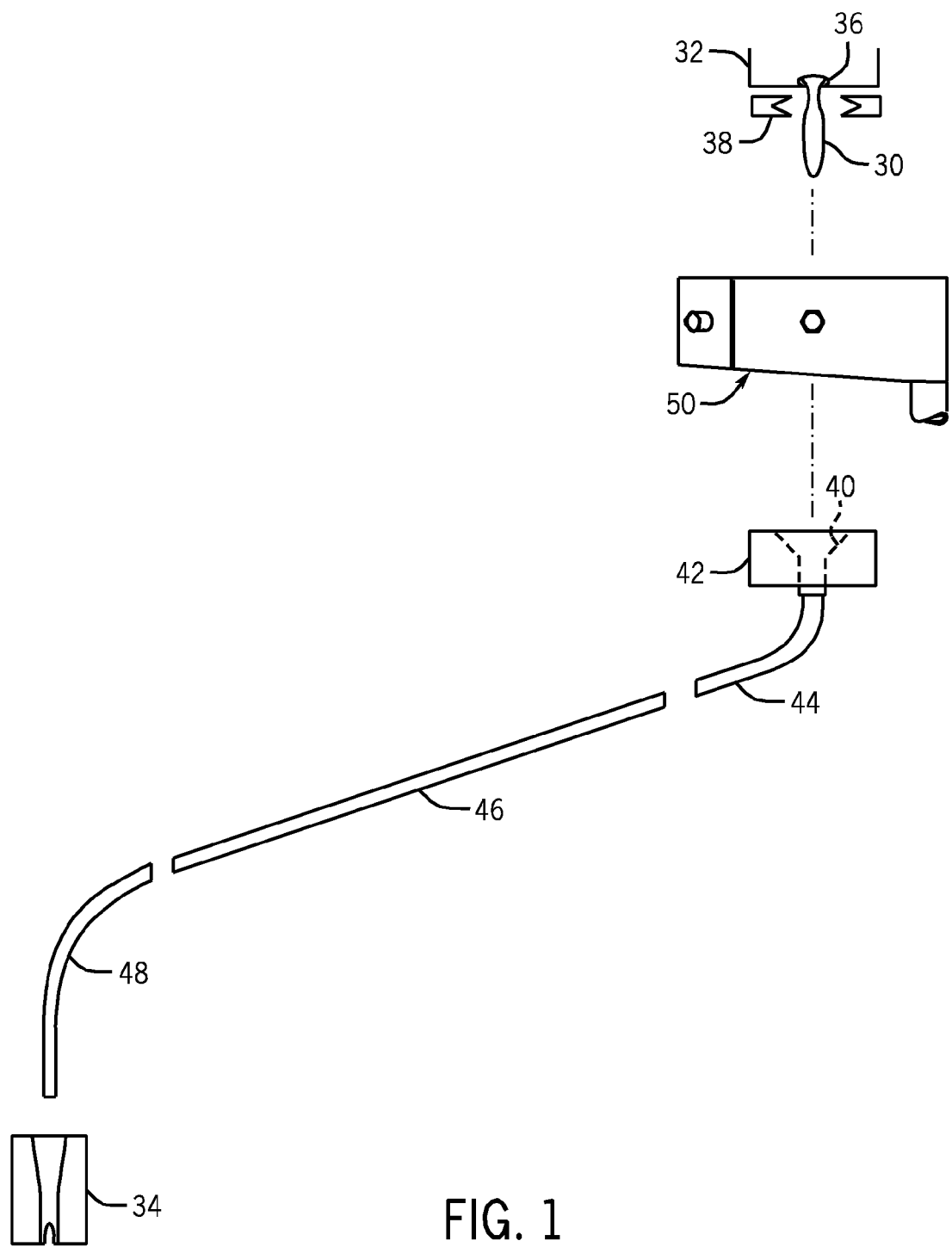
FIG. 1 is a somewhat schematic side view of a glass gob supply and distribution system for supplying and delivering gobs to blank molds, with a spray box integral to the present invention interposed in the path of gobs falling from the gob supply system prior to their distribution by the gob distribution system.

Prior to discussing the apparatus of the present invention, it is helpful to briefly describe the components and function of apparatus in a generic glass gob supply and distribution system used to supply and distribute glass gobs to an I.S. machine. Referring to FIG. 1, the components of such a glass gob supply and distribution system is illustrated in schematic form depicting the gravitational delivery of a glass gob 30 from a gob feeder 32 to a blank mold 34. Molten glass exits the gob feeder 32 through a spout 36 in the bottom of the gob feeder 32, and is cut by a schematically depicted glass gob shears mechanism 38 into a sequence of glass gobs 30. For the purposes of simplicity in FIG. 1, only a single glass gob 30 is shown as being cut by the glass gob shears mechanism 38 from a single stream of molten glass exiting the gob feeder 32 through the spout 36 in the bottom of the gob feeder 32, but it will be understood that there are typically two, three, or four glass gobs 30 being cut and falling simultaneously in an array.

In a prior art system, the glass gobs 30 fall downwardly into a funnel 40 contained in a gob distributor 42 and then into a scoop 44 mounted on the bottom of the distributor 42 which is moved to supply glass gobs 30 to a plurality of different sections of the I.S. machine (not shown in FIG. 1). The scoop 44 is curved to redirect the glass gobs 30 from a vertical trajectory to a diagonal trajectory. From the bottom end of the scoop 44, the glass gobs 30 are directed into the upper end of an inclined trough 46. From the lower end of the trough 46, the glass gobs 30 are directed into the top end of a deflector 48 that is curved to redirect the glass gobs 30 from the diagonal trajectory back to a vertical trajectory above the blank mold 34. From the lower end of the deflector 48, the glass gobs 30 fall into the open top side of the blank mold 34.

In the falling gob lubricating dispersion application system and method of the present invention, an enclosure referred to herein as a spray box 50 is located intermediate the path of the glass gobs 30 as they fall after being cut by the shears mechanism 38 and before entering the funnel 40 in the gob distributor 42. It is the function of the spray box 50 as well as other components of the falling gob lubricating dispersion application system and method of the present invention which will be discussed below to coat the falling glass gobs 30 with a lubricating dispersion prior to the entry of the glass gob 30 into the glass gob distribution system.

Figure 2:
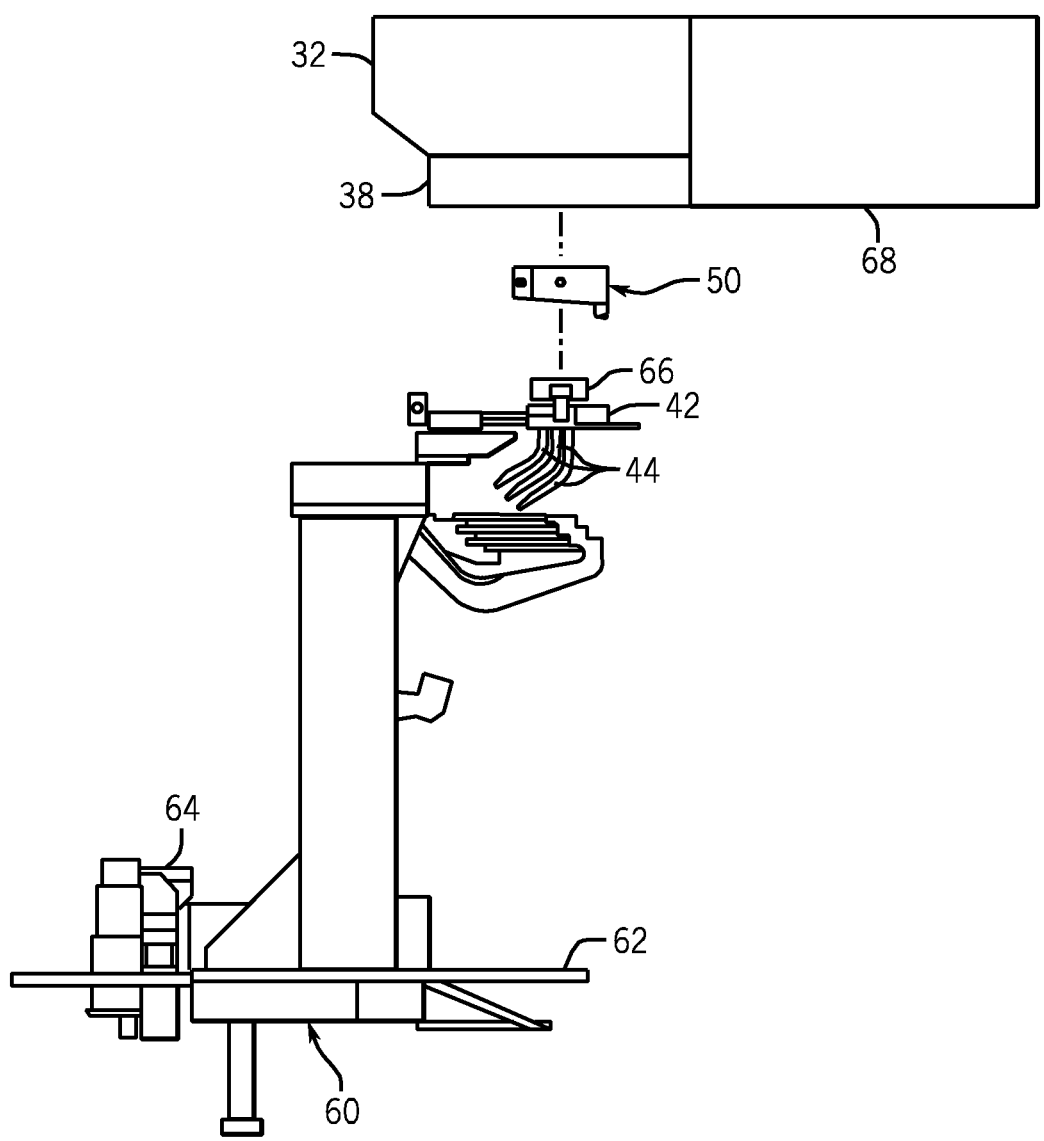
FIG. 2 is a side view of an I.S. machine showing a forehearth, a feeder and spout, and a shears mechanism which are components of the gob supply system, all located above the spray box for applying a liquid-based lubricating dispersion as taught by the present invention of the present invention, and the gob distribution apparatus located below the spray box.

Referring next to FIG. 2, an I.S. machine 60 is shown from a side thereof, with the blank side on the right side thereof as shown in FIG. 2, and the blow side on the left side thereof as shown in FIG. 2. Located near the bottom of the I.S. machine 60 on the blank side thereof is a platform 62, and located on the blow side of the I.S. machine 60 is a conveyor 64 on which blown glass containers are moved away from the I.S. machine 60 after they have been formed. The gob distributor 42 and the scoops 44 are located at the top of the I.S. machine 60 on the blow side thereof. It may be noted that there are three scoops 44, meaning that the I.S. machine 60 is a triple gob I.S. machine (three glass gobs 30 are dropped simultaneously and each section of the I.S. machine 60 has three sets of molds).

An interceptor 66 is shown as being located above the gob distributor 42, although in normal operation of the I.S. machine 60 the interceptor 66 is withdrawn from the path of the glass gobs 30 falling into the gob distributor 42. The interceptor 66 is used to disrupt the flow of the glass gobs 30 from entering the gob distributor 42 and the other components of the glass gob distribution system, typically when components of the section (including the blank molds and the blow molds) require servicing with the rest of sections of the I.S. machine 60 still in operation. The interceptor 66 diverts the glass gobs 30 into a trash area (not shown herein) from which the glass material can be recycled.

The shears mechanism 38 in FIG. 2 is shown in highly schematic fashion, as is the gob feeder 32 (which includes the spout 36 (shown in FIG. 1 but not in FIG. 2). The molten glass is provided from a forehearth, with only the output end of the forehearth which is the equalizer 68 of the forehearth being shown in FIG. 2. The equalizer 68 provides the molten glass to the gob feeder 32.

Figure 3:
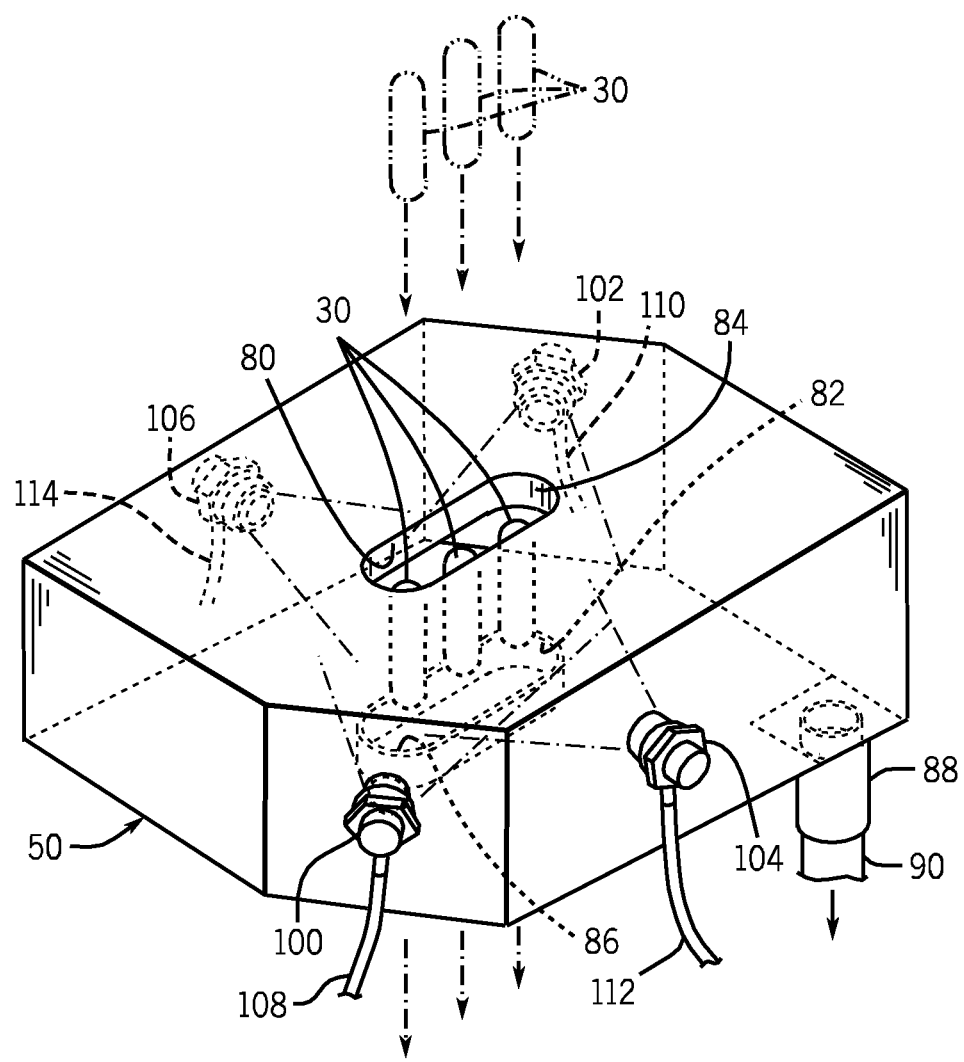
FIG. 3 is an isometric view of the spray box illustrated in FIG. 2, showing spray nozzles mounted in the spray box to spray the lubricating dispersion onto glass gobs as they fall through openings located on the top and bottom sides of the spray box.
Figure 4:
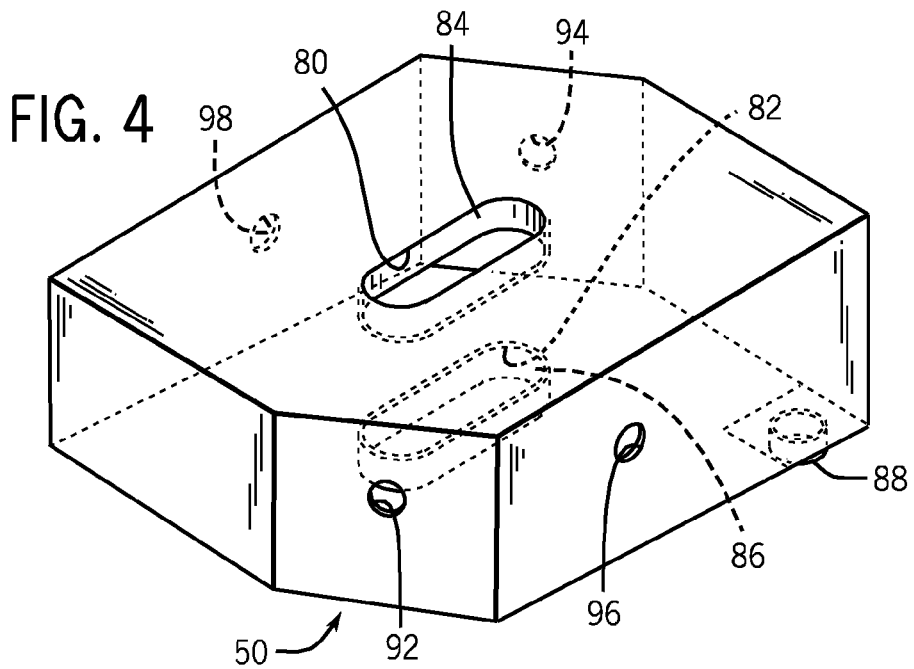
FIG. 4 is an isometric view of the spray box illustrated in FIGS. 2 and 3 without the spray nozzles mounted therein.
Figure 7:
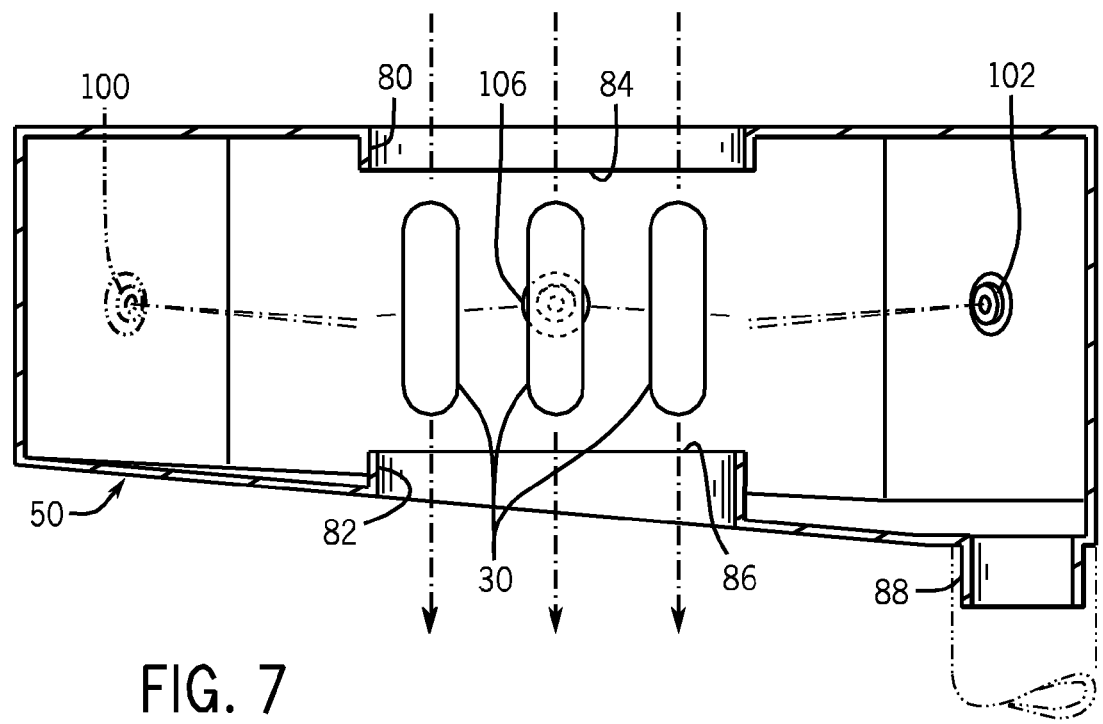
FIG. 7 is a cross-sectional view of the spray box illustrated in FIGS. 2 through 6 from a side thereof, showing the spray patterns of three of the spray nozzles and their coverage of glass gobs falling through the openings located on the top and bottom sides of the spray box.

Referring next to FIGS. 3 through 7, the spray box the spray box 50, which is preferably made of a heat-resistant material such as steel, is shown in considerable detail. As best shown in FIGS. 3, 4, and 7, the spray box 50 is hollow inside, and has oblong circular openings 80 and 82 located in the top and bottom sides thereof, respectively. The openings 80 and 82 are sized to allow three glass gobs 30 to simultaneously pass therethrough, although those skilled in the art will appreciate that the spray box 50 and its openings 80 and 82 could be sized to allow anywhere from one to four glass gobs 30 to simultaneously pass therethrough, depending upon the configuration of the I.S. machine. While most I.S. machines today are two, three, or four gob machines, it would not be difficult to allow even more glass gobs 30 to simultaneously pass therethrough if desired.

Located around the openings 80 and 82 are inwardly extending flanges 84 and 86, respectively, which entirely surround the periphery of the openings 80 and 82. For the three-gob spray box 50 illustrated in FIGS. 3 through 7, the approximate overall horizontal dimensions (length and width) are approximately 26 inches (66 cm) by 20.5 inches (52 cm), with the spray box 50 having a variable depth of approximately 8.5 inches (21.6 cm) at one end thereof to 10 inches (25.4 cm) at the other end thereof. The openings 80 and 82 are each approximately 3 inches (7.6 cm) wide, and the opening 80 on top of the spray box 50 is approximately 9 inches (22.9 cm) long, while the opening 82 on the bottom of the spray box 50 is approximately 8.5 inches (21.3 cm) long. The inwardly extending flanges 84 and 86 each extend approximately one inch (2.54 cm) into the interior of the spray box 50.

When the spray box 50 is installed into its operating position in the path of falling glass gobs 30, its top side if in a horizontal plane, with its bottom side being inclined to cause any oversprayed fluid contained therein to drain to the deeper end, where an outlet 88 is located in the bottom side of the spray box 50. A segment of drain tubing 90 may be attached to the outlet 88 to conduct fluid from the spray box 50 to an external location such as a container (not shown in FIGS. 3 through 7) for collection, recycling, or disposal. It will be appreciated that the flange 86 located inside the bottom side of the spray box 50 will enhance the ability to collect fluid from the inside of the spray box 50.

The spray box 50 has four sides oriented in a rectangular configuration, with two longer sides and two shorter sides being located orthogonally to each other. Two angled side members are located at two opposite corners of the spray box 50. The two angled side members have apertures 92 and 94 (best shown in FIG. 4) respectively located therein. Located in the two opposite longer sides of the spray box 50 respectively are apertures 96 and 98. The four apertures 92, 94, 96, and 98 are all located such that they are orthogonal to the area within the spray box 50 that is defined intermediate the opening 80 in the top side of the spray box 50 and the opening 82 in the bottom side of the spray box 50. They are also located at approximately the same distance below the top side of the spray box 50, and in the preferred embodiment are angled downwardly approximately one degree to approximately ten degrees from horizontal.

Figure 5:
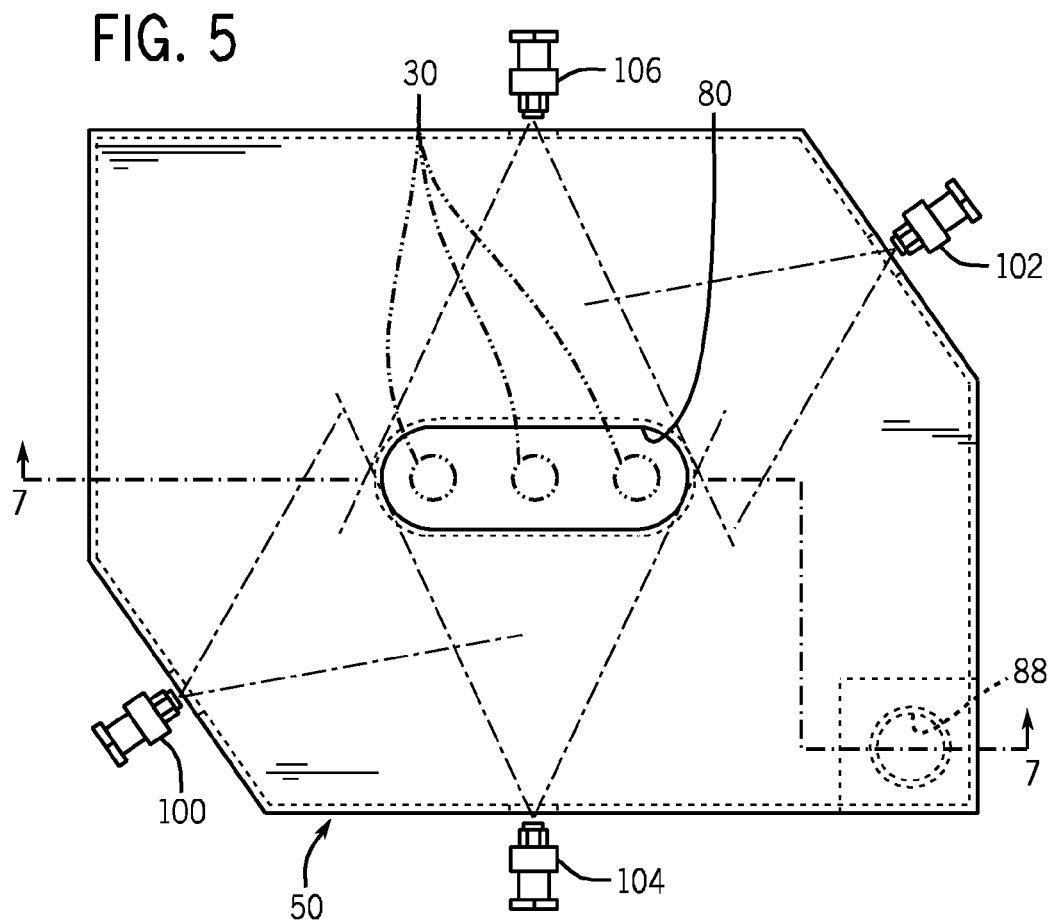
FIG. 5 is a top plan view of the spray box and spray nozzles illustrated in FIG. 3, showing the spray patterns of the spray nozzles and their coverage of glass gobs falling through the openings located on the top and bottom sides of the spray box.
Figure 6:
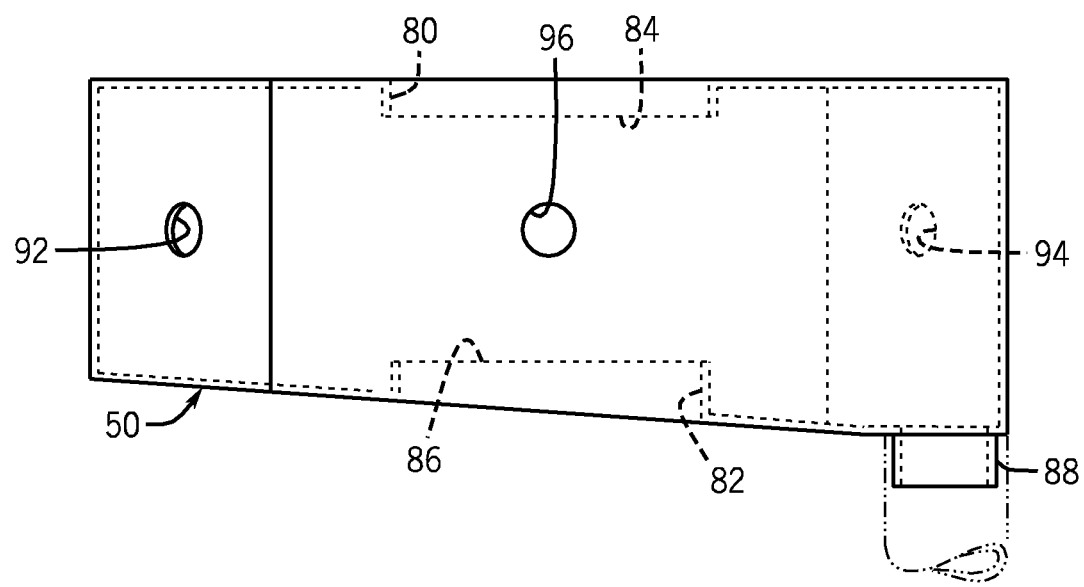
FIG. 6 is a side plan view of the spray box illustrated in FIGS. 2 through 5, showing the sloping bottom side used to recover oversprayed lubricating dispersion and a drain connection at the deep end of the spray box.

Respectively mounted in or adjacent to the four apertures 92, 94, 96, and 98 are four spraying nozzle assemblies 100, 102, 104, and 106 (which, like the apertures 92, 94, 96, and 98, are preferably angled downwardly approximately one degree to approximately ten degrees from horizontal). While four nozzle assemblies 100, 102, 104, and 106 are used in the embodiment shown in the drawings, it will be understood that while multiple nozzles are necessary in order to fully coat the glass gobs 30 with the lubricating dispersion, only the two nozzle assemblies 104 and 106, which are located on opposite sides of the array of multiple glass gobs 30 (three glass gobs 30 in the example illustrated in the drawings), are presently believed to be essential. The spraying nozzle assemblies 100, 102, 104, and 106 each have a horizontal spray pattern that will be sufficiently wide to coat all of the glass gobs 30 passing through the spray box 50 simultaneously in a linear array as best shown in FIG. 5, with this spray pattern preferably being approximately 50 degrees wide for the configuration and relative size of the spray box 50 described herein. The spraying nozzle assemblies 100, 102, 104, and 106, which collectively comprise a source of a liquid-based lubricating dispersion for lubricating the glass gobs 30, and are respectively supplied with the substance to be sprayed with supply lines 108, 110, 112, and 114. The spraying nozzle assemblies 100, 102, 104, and 106 each direct a spray of the lubricating dispersion therefrom from a different orientation onto the glass gobs 30 to substantially completely coat the gobs with the lubricating dispersion.

Referring now to FIGS. 8 and 9, detailed cross-sectional views of an exemplary spraying nozzle assembly 100 is shown, it being understood that the other three spraying nozzle assemblies 102, 104, and 106 are of identical construction. Further, while the nozzle assembly 100 shown is an airless spray nozzle, it may also be feasible to use air-spraying instead, and it will be understood that the nozzle assembly 100 shown and discussed herein is exemplary rather than limiting in any way. FIG. 8 shows the spraying nozzle assembly 100 in its closed position, while FIG. 9 shows the spraying nozzle assembly 100 in its open position. The spraying nozzle assembly 100 has two housing members, namely a spring housing 120 open at a top end thereof, onto which is mounted a spraying unit casing 122 that is open at the bottom end thereof and at the top end thereof.

A spring 124 is located inside the spring housing 120 near the bottom thereof, with a piston 126 located inside the spring housing 120 being urged toward the distal end of the spraying unit casing 122. Connected to the side of 126 opposite the piston 126 is a connecting rod 128, which in turn is connected to reciprocate a hollow cylindrical sleeve 130 having a closed end at its point of connection to the connecting rod 128. Mounted into the top of the spraying unit casing 122 is a hollow cylindrical filter sleeve 132 that is partially located inside the distal end of the sleeve 130. Fluid may pass through the filter sleeve 132 from a cylindrical area intermediate the interior of the spraying unit casing 122 and the exterior of the sleeve 130 to locations inside the sleeve 130.

A nozzle tip 134 is installed into the distal end of the spraying unit casing 122, and retains the filter sleeve 132 in the position in which it is illustrated in FIGS. 8 and 9. The nozzle tip 134 has a spray orifice 136 centrally located therein, as well as an inwardly-oriented frustoconical valve seat 138 contained therein. Mounted within the interior of the sleeve 130 from the closed end thereof and extending upwardly therefrom is a closing pin 140 having a conical valve element 142 at the distal end thereof, which the valve element 142 is in engagement with the valve seat 138 when the spraying nozzle assembly 100 is in its closed position as shown in FIG. 8, and is withdrawn from the valve seat 138 when the spraying nozzle assembly 100 is in its open position shown in FIG. 9.

The spraying nozzle assembly 100 is pressure-operated, and has a lubricating dispersion provided to an inlet 144 located in a side of the spraying unit casing 122. When the pressure of the lubricating dispersion is below an opening pressure, the spring 124 drives the connecting rod 128 to maintain the sleeve 130 and the closing pin 140 in the position in which they are shown in FIG. 8, maintaining the spraying nozzle assembly 100 in a closed, non-non-spraying position. When the pressure of the lubricating dispersion is at or above the opening pressure, the pressure of the lubricating dispersion on the closed end of the sleeve 130 drives the sleeve 130, the connecting rod 128, and the piston 126 downwardly, causing the closing pin 140 to be retracted to the position in which it is shown in FIG. 9, retracting the valve element 142 from the valve seat 138 and allowing the lubricating dispersion to be sprayed from the spraying nozzle assembly 100.

In the preferred embodiment, the spraying nozzle assemblies 100, 102, 104, and 106 may be, for example, those spraying nozzles available from Timcal SA, of Bodio, Switzerland as MS 61 spraying nozzles. As mentioned above, in the preferred embodiment a the spray box 50 degree spraying angle is preferred, with nozzle orifices of 0.53 mm, 0.66 mm, 0.79 mm, and 0.91 mm being available as Timcal part numbers 321.3101, 321.3102, 321.3103, 321.3104, respectively. The 0.53 mm nozzle may be used in a preferred embodiment in order to minimize the volume of lubricant that is sprayed.

Figure 10:
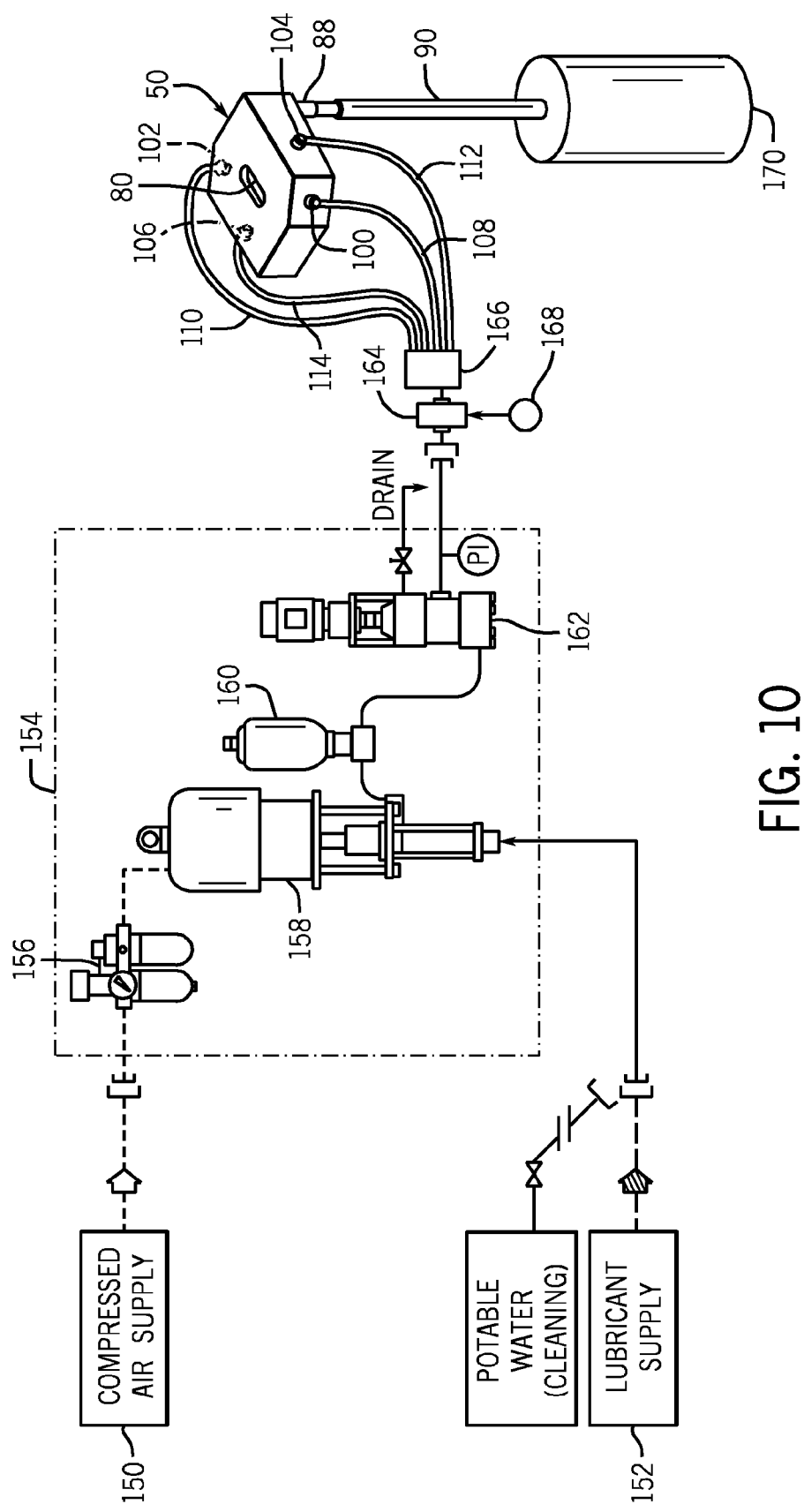
FIG. 10 is a somewhat schematic depiction of the equipment and supply lines for the lubricating dispersion to the spray box and the collection apparatus for the oversprayed lubricating dispersion recovered from the spray box.

Referring next to FIG. 10, a somewhat schematic view of an exemplary system for providing the lubricating dispersion to the spray box 50 is illustrated. The system is operated by air pressure, with compressed air being supplied by a compressed air supply 150. The lubricating dispersion is supplied to the system from a lubricant supply 152. A number of components of the system collectively comprising a pump system are mounted in a high pressure module indicated generally by the reference numeral 154. While the pump system described in the exemplary embodiment is a high pressure system, it will be understood that low pressure spraying may also be applicable and the discussion of high pressure spraying herein is intended to be exemplary rather than limiting in any way.

The high pressure module 154 includes an air unit 156, a high pressure pump 158, a pressure equalizer 160, and a rotary filter 162. Compressed air is supplied by the compressed air supply 150 to the air unit 156, which treats and regulates the compressed air and provides the regulated compressed air to the high pressure pump 158 at the desired lubricant pressure. The lubricating dispersion is supplied from the lubricant supply 152 to the high pressure pump 158, which pumps the lubricating dispersion to the pressure equalizer 160, to dampen any pressure variations produced by the high pressure pump 158. The lubricating dispersion pumped by the high pressure pump 158 through the pressure equalizer 160 flows through the rotary filter 162 and leaves the high pressure module 154.

The lubricating dispersion flows from the rotary filter 162 to a sliding valve 164 that controls the supply of high pressure lubricating dispersion to a flow distributor 166. The sliding valve 164 is operated by an electrical control signal supplied by a flow controller 168. When the electrical control signal is provided by the flow controller 168 to the sliding valve 164, the sliding valve 164 opens to allow the high pressure lubricating dispersion to be supplied to the flow distributor 166. The sliding valve 164 may be an LS 3/2-1" sliding valve available from Timcal Graphite & Carbon, a member of IMERYS.

High pressure lubricating dispersion supplied to the flow distributor 166 is provided by the flow distributor 166 to the spraying nozzle assemblies 100, 102, 104, and 106 through the supply lines 108, 110, 112, and 114, respectively. The spraying nozzle assemblies 100, 102, 104, and 106 spray the lubricating dispersion onto the hot glass gobs 30 as they pass through the spray box 50. Excess lubricating dispersion flows out of the spray box 50 through the outlet 88 and into the drain tubing 90, with the excess lubricating dispersion being collected in a container 170, from which it can be recycled or disposed of.

It will be appreciated that the high pressure module 154 has three different elements. The first is a compressed air aspect, with compressed air being treated, regulated, and used to operate the high pressure pump 158 to provide the required pressure to the lubricating dispersion. The second aspect is the flow path for the lubricating dispersion, in which the lubricating dispersion being drawn from the lubricant supply 152 through the high pressure pump 158, which boosts its pressure to spraying pressure (typically approximately 10 to 100 bar (145 to 1450 PSI) with approximately 40 to 80 bar (580 to 1160 PSI) being preferable). This second aspect has the lubricating dispersion pumped from the high pressure pump 158 through the pressure equalizer 160 and the rotary filter 162, from which it is provided to the sliding valve 164 for controlled supply to the flow distributor 166 and the supply lines 108, 110, 112, and 114 and through the spraying nozzle assemblies 100, 102, 104, and 106, respectively, into the spray box 50.

The third aspect is the electrical supply to provide electrical power to operate the rotary filter 162 and the control circuitry to operate the flow controller 168 to provide the electrical control signal to the sliding valve 164 to open it to thereby allow the high pressure lubricating dispersion to be supplied to the flow distributor 166, the supply lines 108, 110, 112, and 114, and through the spraying nozzle assemblies 100, 102, 104, and 106, respectively, into the spray box 50.

Also shown in FIG. 10 is a potable water supply 172 that may be connected to the supply line to the high pressure pump 158 when the lubricant supply 152 is disconnected to provide water to clean out the various flow path components of the system, including the high pressure pump 158, the pressure equalizer 160, the rotary filter 162, the sliding valve 164, the flow distributor 166, the supply lines 108, 110, 112, and 114, and the spraying nozzle assemblies 100, 102, 104, and 106.

The Lubricating Dispersion

The lubricating dispersion used by the falling gob lubricating dispersion application system and method of the present invention is preferably a liquid-based dispersion rather than a particulate flow. In a preferred embodiment, the lubricating dispersion is water-based, with water making up between approximately 50 percent and approximately 98 percent of the lubricating dispersion, and preferably between approximately 60 percent and approximately 80 percent of the lubricating dispersion, and most preferably between approximately 65 percent and approximately 75 percent of the lubricating dispersion. The lubricating dispersion also preferably includes a solid lubricant in powder form, a dispersing agent (a wetting agent), and a rheological modifier, and may also include other lubricant additives.

An alternative to a water-based lubricating dispersion is an organic solvent-based dispersion in which the lubricating solid is dispersed in an organic solvent such as mineral oil (preferred), vegetable oil, iso-propanol, or methyl ethyl ketone. Stabilizing additives or agents that can be used with organic solvent-based dispersions include hydrogenated castor oil derivatives like RHEOCIN® Mastergels from Rockwood Specialties Group of Princeton, N.J., ISCATHIX® ISP from Isca UK LTD of Wales, UK, organophilic bentonites like TIXOGEL® VP-V (Quaternium-90 Bentonite) and TIXOGEL® VZ-V (Stearalkonium Bentonite) from Rockwood Specialties Group, or pre-activated amide waxes like CRAYVALLAC®PA3 from Arkema Coated Resins of Cary, N.C.

In a preferred embodiment, the solid lubricant in powder form is synthetic or natural graphite having particle size characterized by d90 below 150 microns (90 percent of the particles are smaller than 150 microns), preferably below 75 microns, and most preferably below 50 microns measured by a laser diffraction device such as the Malvern Mastersizer S with sample dispersion unit (see the measurement methods below). In one embodiment, the solid lubricant may be as Timrex® KS 44 graphite, which is available from Timcal Graphite & Carbon, a member of IMERYS, which has a d90 of approximately 44 microns. The graphite lubricant could include particle sizes in the submicron range such as, for example, colloidal graphite. Alternative solid lubricants are molybdenum disulfide ($MoS_2$), tungsten disulfide ($WS_2$), hexagonal boron nitride (h-BN) or mixtures thereof. The solid lubricant in powder form makes up between approximately 2 percent and approximately 50 percent of the lubricating dispersion, and preferably between approximately 15 percent and approximately 40 percent of the lubricating dispersion, and most preferably between approximately 25 percent and approximately 35 percent of the lubricating dispersion.

A brief description of a measuring method using particle size distribution by laser diffraction will now be briefly presented. The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into by means of a calculator. The particle size distribution is typically expressed in volume fraction below a specific particle diameter: d90 means 90 percent of the volume of the particles has a diameter below the given value. A small sample of graphite is mixed with a few drops of wetting agent and a small amount of water. The sample prepared in the described manner is introduced in the storage vessel of the apparatus and measured. Applicable standards include ISO 13320-1 and ISO 14887.

In a preferred embodiment, the dispersing agent is preferably a PEO-PPO-PEO block copolymer. Alternative dispersing agents are ionic dispersants like sulphonates, non-ionic dispersants like alcohol polyethoxylates, or alkyl polyether, or any other dispersants known to those skilled in the field of pigment dispersion. The dispersing agent makes up between approximately 0.01 percent and approximately 10 percent of the lubricating dispersion, and preferably between approximately 0.1 percent and approximately 5 percent of the lubricating dispersion, and most preferably between approximately 0.25 percent and approximately 1 percent of the lubricating dispersion.

In a preferred embodiment, the rheological modifier serves as a thickener and is preferably a polysaccharide or Xanthan gum. Alternative rheological modifiers are inorganic thickeners like phillosilicates, or other organic thickeners like carboxy methyl cellulose or cellulose ethers, or like polyacrylates, or like polyurethanes, or any other thickeners known to those skilled in the fields of pigment dispersion. The rheological modifier makes up between approximately 0.01 percent and approximately 25 percent of the lubricating dispersion, and preferably between approximately 0.1 percent and approximately 5 percent of the lubricating dispersion, and most preferably between approximately 0.15 and approximately 1 percent of the lubricating dispersion.

In a preferred embodiment, other lubricant additives may be included such as binder materials like inorganic binder materials such as silicates, or organic binder materials like polyvinyl acetates, or polyurethanes. The function of the binder is the improvement of the lubricant adhesion to the glass and therefore an enhancement to the lubrication qualities of the dispersion. The binder makes up between approximately 0.01 percent and approximately 30 percent, preferably between 0.1 and 15 percent, and most preferably between approximately 1 percent and approximately 10 percent of the lubricating dispersion.

In a preferred embodiment, additional lubricants additives that may be included are a pH modifier like ammonia or amines, or any other pH modifier known to those skilled in the field of pigment dispersion. Other lubricants additives are a defoamer like mineral oils or a silicon based or equivalent defoamer known to those skilled people in the field of pigment dispersion. Preservatives or biocides can also be included in the dispersion to improve its shelf life.

The Operation of the System

Figure 11:
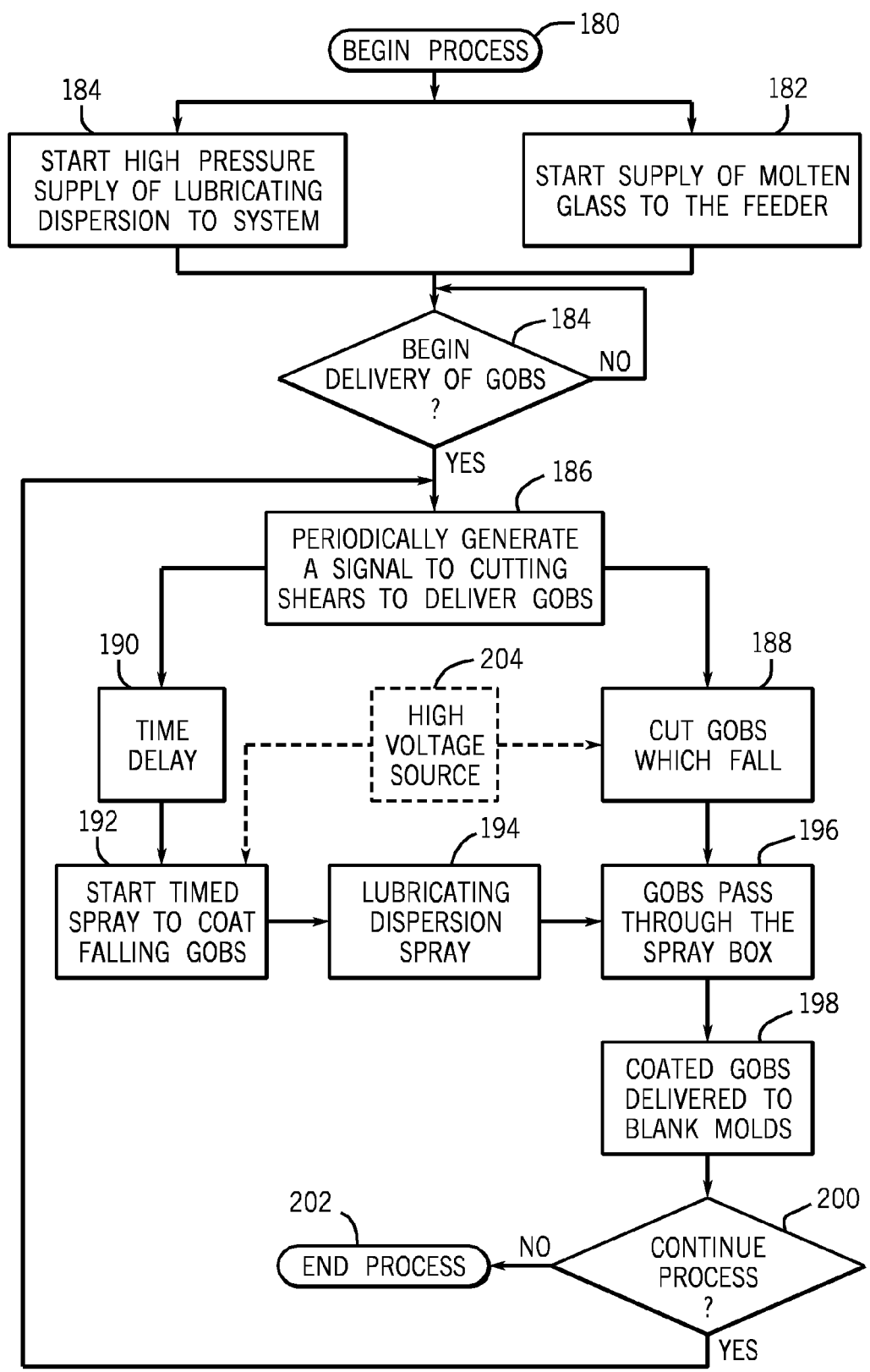
FIG. 11 is a schematic block diagram of a control system that may be used to control spraying the lubricating dispersal onto the glass gobs based upon the timing signals from the I.S. machine that control the emission of glass gobs from the shears mechanism.

Referring finally to FIG. 11, an exemplary control system and process that may be used to control the spraying of the lubricating dispersal onto the hot glass gobs 30 as they pass through the spray box 50 based upon the timing signals from the I.S. machine that control the emission of glass gobs from the shears mechanism is demonstrated. It begins with an initiate process step 180, following which the equalizer 68 of the furnace (shown in FIG. 2) supplies molten glass to the gob feeder 32 (also shown in FIG. 2) in a start molten glass supply to feeder step 182, and the falling gob lubricating dispersion application system of the present invention shown in FIG. 10 supplies the lubricating dispersion at a desired high pressure in a start high pressure lubricating dispersion to system step 184.

Next, in a begin delivery of gobs determination step 184, the system will wait until it receives an instruction to initiate the delivery of the glass gobs 30, and, once that determination is made, the process moves to a periodically generate a signal to deliver gobs step 186 in which the signal will cause the feeding of molten glass from the gob feeder 32 (shown in FIG. 2) and the cutting of glass gobs 30 by the shears mechanism 38 (also shown in FIG. 2) in a cut gobs which fall step 188. Additionally, once the determination that delivery of the glass gobs 30 is made in the periodically generate a signal to deliver gobs step 186, a time delay is initiated in a time delay step 190.

The time delay is sufficiently long to allow the glass gob 30 to fall from the shears mechanism 38 (shown in FIG. 2) until they are about to enter the spray box 50 (shown in FIGS. 3 through 7), at which time the time delay times out and initiates a start timed spray step 192 by opening the sliding valve 164 (shown in FIG. 10) to start the high pressure lubricating dispersal to be sprayed in step 194 inside the spray box 50 to coat the glass gobs 30 as they pass through the spray box 50 in a gobs pass through spray box step 196. The start timed spray step 192 causes the sliding valve 164 to be open only so long as the glass gobs 30 are located within the spray box 50, and then closes the sliding valve 164 to stop the spray of the high pressure lubricating dispersal when it is determined by timing that the blank mold 34 are no longer contained in the spray box 50.

Subsequently, the glass gobs 30 which are coated with the lubricating dispersal are delivered to their respective blank molds in a deliver coated gobs to blank molds step 198. Referring briefly to FIG. 1 in conjunction with FIG. 11, it will be appreciated that the lubricating dispersal on the glass gobs 30 will serve to lubricate the scoop 44, the trough 46, and the deflector 48. Still referring to FIG. 1 in conjunction with FIG. 11, while the exemplary embodiment discussed herein contemplates that the spray box 50 is located below the gob feeder 32 and the shears mechanism 38 and above the gob distributor 42, it is also possible to locate the spray box 50 at other locations, such as intermediate the bottom of the deflectors 48 and above the blank molds 34.

Following the delivery of the glass gobs 30 to the blank molds 34, the process will continue unless it is determined that it should be stopped in a continue process determination step 200. It the process is to continue, it moves back to the periodically generate a signal to deliver gobs step 186. If, on the other hand, the process is to terminate, it moves instead to a process termination step 202.

Another optional possibility is to place an electrostatic charge differential that will enhance the distribution of the lubricating dispersion onto the glass gobs 30. In FIG. 11, this is shown as the placement of a high voltage source 204 between a location contacting the glass gobs 30 as they are formed, such as when they are in contact with the shears mechanism 38 (shown in FIGS. 1 and 2) and the spraying nozzle assemblies 100, 102, 104, and 106.

It may therefore be appreciated from the above detailed description of the preferred embodiment of the present invention that it provides a system and method to apply a liquid-based lubricating dispersion to glass gobs after the gobs are formed and before they are loaded into blank molds without requiring manual intervention to do so. The falling gob lubricating dispersion application system and method of the present invention applies the liquid-based lubricating dispersion to the gobs while they are in free fall and not in contact with any portion of the gob distribution system, thereby also providing lubrication to the gob distribution system. The falling gob lubricating dispersion application system and method of the present invention entirely obviates the need to swab the blank molds with a lubricating dispersion, thereby removing a variable, difficult, and labor intensive operation of hand swabbing the blank molds, with the lubricant thereby continuously lubricating the blank molds, the neck rings, and the blow molds. Finally, the falling gob lubricating dispersion application system and method of the present invention achieves numerous advantages without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for applying a lubricant to free falling hot glass gobs prior to the distribution and loading of the gobs into respective blank molds in an I.S. machine, the system comprising:
   an enclosure comprising a top surface, a bottom surface, and side walls extending between the top surface and the bottom surface, the top surface and the bottom surface having corresponding openings therein, wherein the openings in the top surface and the bottom surface are arranged and configured in the top surface and the bottom surface to allow the free falling gobs to pass freely through the openings in the enclosure without contacting the enclosure when the enclosure is mounted in the path of the free falling gobs;
   a source of a liquid-based lubricating dispersion for lubricating the gobs;
   a plurality of nozzles being mounted in or adjacent to the enclosure, each of the nozzles being arranged and configured to direct a spray of the lubricating dispersion therefrom into the enclosure and onto the free falling gobs as they pass through the enclosure to substantially completely coat the gobs with the lubricating dispersion sprayed from the nozzles; and
   a pump system for pumping the lubricating dispersion from the source of the lubricating dispersion to the nozzles mounted in the enclosure.

2. A system as defined in claim 1, wherein the I.S. machine comprises a gob feeder, a shears mechanism for cutting glass gobs from a molten glass stream supplied by the gob feeder, and a gob distribution system that distributes the glass gobs to the blank molds, and wherein the enclosure is arranged and configured for installation intermediate the path of the glass gobs as they fall after being cut by the shears mechanism and before they enter the gob distribution system.

3. A system as defined in claim 1, wherein the enclosure additionally comprises:
   an inwardly extending flange surrounding the opening in the top surface of the enclosure; and
   an inwardly extending flange surrounding the opening in the bottom surface of the enclosure.

4. A system as defined in claim 3, wherein the enclosure additionally comprises:
   an outlet located in the bottom side of the enclosure through which oversprayed amounts of the lubricating dispersion collected on the bottom surface of the enclosure may be drained; and
   a drain tubing attached to the outlet to conduct oversprayed amounts of the lubricating dispersion collected on the bottom surface of the enclosure and drained through the outlet to an external location for collection, recycling, or disposal.

5. A system as defined in claim 1, wherein the source of the lubricating dispersion comprises:
   a high pressure pump system for supplying the lubricating dispersion from a lubricant supply to the nozzles.

6. A system as defined in claim 5, wherein the high pressure pump system comprises:
   a high pressure pump in fluid communication with the lubricant supply;
   an air unit for supplying compressed air to the high pressure pump;
   a pressure equalizer connected to the high pressure pump for dampening pressure variations in the lubricating dispersion pumped by the high pressure pump; and
   a filter connected intermediate the pressure equalizer and the nozzles for filtering the lubricating dispersion pumped by the high pressure pump prior to its supply to the nozzles.

7. A system as defined in claim 1, wherein each of the nozzles have a horizontal spray pattern configured to be sufficiently wide to coat all of the gobs passing through the enclosure.

8. A system as defined in claim 7, wherein the horizontal spray pattern of each of the nozzles is approximately 50 degrees wide.

9. A system as defined in claim 7, wherein the horizontal spray pattern of each of the nozzles is angled downwardly approximately one degree to approximately ten degrees from horizontal.

10. A system as defined in claim 1, wherein there are four nozzles mounted in or adjacent to the enclosure, each of the nozzles being arranged and configured to direct a spray of the lubricating dispersion therefrom into the enclosure and onto the free falling gobs as they pass through the enclosure.

11. A system as defined in claim 10, wherein the enclosure has four sides oriented in a rectangular configuration, with two longer sides and two shorter sides being located orthogonally to each other, with two angled side members being located at two opposite corners of the enclosure, and wherein the openings in the top surface and the bottom surface of the enclosure are arranged and configured to allow a plurality of gobs to simultaneously pass through the openings in a linear array;
   wherein two of the nozzles are respectively mounted in or adjacent to the enclosure in the long sides of the enclosure and are arranged and configured to direct a spray of the lubricating dispersion therefrom directly onto the linear array of gobs passing through the enclosure; and
   wherein the other two of the nozzles are respectively mounted in or adjacent to the enclosure in the angled sides of the enclosure and are arranged and configured to direct a spray of the lubricating dispersion therefrom onto the linear array of gobs passing through the enclosure.

12. A system as defined in claim 1, wherein the lubricating dispersion comprises:
   water;
   a powdered solid lubricant having a particle size characterized by a d90 below approximately 150 microns; and
   a dispersing agent.

13. A system as defined in claim 12, wherein the powdered solid lubricant comprises:
   a material selected from the group consisting of synthetic graphite, natural graphite, molybdenum disulfide (MoS2), tungsten disulfide (WS2), hexagonal boron nitride (h BN), and mixtures thereof.

14. A system as defined in claim 12, wherein the lubricating dispersion additionally comprises:
   a rheological modifier serving as a thickener.

15. A system as defined in claim 14, wherein the water comprises between approximately 50 percent and approximately 98 percent by weight of the lubricating dispersion, the powdered solid lubricant comprises between approximately 2 percent and approximately 50 percent by weight of the lubricating dispersion, the dispersing agent comprises between approximately 0.01 percent and approximately 10 percent by weight of the lubricating dispersion, and the rheological modifier comprises between approximately 0.01 percent and approximately 25 percent by weight of the lubricating dispersion.

16. A system as defined in claim 12, wherein the lubricating dispersion additionally comprises:

a binder to improve the adhesion of the solid lubricant to the hot glass.

17. A system as defined in claim 12, wherein the dispersing agent comprises:
at least one material selected from the group consisting of a PEO-PPO-PEO block copolymer, a glycolionic dispersants like sulphonates, a non-ionic dispersants like alcohol polyethoxylates, and alkyl polyether.

18. A system as defined in claim 1, wherein the lubricating dispersion comprises:
an organic solvent;
a powdered solid lubricant having a particle size characterized by a d90 below approximately 150 microns; and
a stabilizing additive.

19. A system as defined in claim 1, additionally comprising:
a high voltage source for establishing an electrostatic charge differential between the lubricating dispersion and the glass gobs to reduce overspray of the lubricating dispersion.

20. A system for applying a lubricant to free falling hot glass gobs sheared from a stream of molten glass provided from a feeder prior to the distribution and loading of the gobs into respective blank molds in an I.S. machine, wherein the I.S. machine comprises a gob supply apparatus for providing gobs and a gob distribution system that distributes the glass gobs to the blank molds, wherein the system comprises:
an enclosure comprising a top surface, a bottom surface, and side walls extending between the top surface and the bottom surface, the top surface and the bottom surface having corresponding openings therein, wherein the enclosure is arranged and configured for installation intermediate the path of the glass gobs as they fall from the gob supply apparatus and before they enter the gob distribution system, and wherein the openings in the top surface and the bottom surface are arranged and configured in the top surface and the bottom surface to allow the free falling gobs to pass freely through the openings in the enclosure without contacting the enclosure when the enclosure is mounted in the path of the free falling gobs;
a high pressure source of a liquid-based lubricating dispersion for lubricating the gobs, the lubricating dispersion comprising powdered synthetic or natural graphite in a water-based dispersion;
at least four nozzles being mounted in or adjacent to the enclosure, each of the nozzles being arranged and configured to direct a spray of the lubricating dispersion therefrom from a different orientation into the enclosure and onto the free falling gobs as they pass through the enclosure to substantially completely coat the gobs with the lubricating dispersion sprayed from the nozzles; and
a pump system for pumping the lubricating dispersion from the source of the lubricating dispersion to the nozzles mounted in the enclosure.

21. A system for applying a lubricant to free falling hot glass gobs in an I.S. machine, the system comprising:
an enclosure comprising corresponding openings respectively located in top and bottom surfaces having side walls extending therebetween, wherein the enclosure is arranged and configured for mounting with respect to the I.S. machine such that free falling gobs pass freely through the openings in the enclosure;
a plurality of nozzles mounted in or adjacent to the enclosure; and
a pump that pumps a liquid-based lubricating dispersion for lubricating the gobs from a source of the lubricating dispersion to the nozzles;
wherein the nozzles are each arranged and configured to direct a spray of the lubricating dispersion into the enclosure and onto the free falling gobs as they pass through the enclosure.

22. A method for applying a lubricant to free falling hot glass gobs sheared from a stream of molten glass provided from a feeder prior to the distribution and loading of the gobs into respective blank molds in an I.S. machine, the method comprising:
locating an enclosure in the path of the free falling gobs, the enclosure comprising a top surface, a bottom surface, and side walls extending between the top surface and the bottom surface, the top surface and the bottom surface having corresponding openings therein, wherein the enclosure is mounted such that the free falling gobs fall through the openings in the top surface and the bottom surface without contacting the enclosure;
pumping a liquid-based lubricating dispersion for lubricating the gobs from a source of the lubricating dispersion to a plurality of nozzles mounted in or adjacent to the enclosure with a pump system; and
directing sprays of the lubricating dispersion emitted from the nozzles into the enclosure and onto falling gobs as they pass through the enclosure to substantially completely coat the gobs with the lubricating dispersion sprayed from the nozzles.

23. A method as defined in claim 22, additionally comprising:
collecting oversprayed lubricating dispersion from the enclosure for collection, recycling, or disposal.

24. A method as defined in claim 22, wherein the pumping system is a high pressure pump system that supplies the lubricating dispersion at a high pressure to the nozzles.

25. A method as defined in claim 22, wherein the sprays of the lubricating dispersion emitted from the nozzles into the enclosure have a horizontal spray pattern configured to be sufficiently wide to completely coat all of the falling gobs passing through the enclosure.

26. A method as defined in claim 25, wherein the horizontal spray pattern of each of the nozzles is approximately 50 degrees wide and is angled downwardly approximately one degree to approximately ten degrees from horizontal.

27. A method as defined in claim 22, wherein the lubricating dispersion comprises:
water;
powdered solid lubricant having a particle size characterized by a d90 below approximately 150 microns; and
a dispersing agent.

28. A method as defined in claim 27, wherein the water comprises between approximately 50 percent and approximately 98 percent by weight of the lubricating dispersion, the powdered solid lubricant comprises between approximately 2 percent and approximately 50 percent by weight of the lubricating dispersion, and the dispersing agent comprises between approximately 0.01 percent and approximately 10 percent by weight of the lubricating dispersion.

29. A method for applying a lubricant to free falling hot glass gobs comprising:
providing a liquid-based lubricating dispersion for lubricating the gobs at a selected location in a path of the free falling gobs; and spraying the lubricating dispersion onto the falling gobs as they pass the selected location to substantially completely coat the gobs with the lubricating dispersion.

\* \* \* \* \*